United States Patent [19]

Lee

[11] Patent Number: 5,299,614
[45] Date of Patent: Apr. 5, 1994

[54] TIRE STEM ASSEMBLY

[76] Inventor: Ching-Jong Lee, No. 24, Alley 46, Lane 32, Sec. 2, Charng Rong Road, Tainan, Taiwan

[21] Appl. No.: 33,922

[22] Filed: Mar. 19, 1993

[51] Int. Cl.$^5$ .............................................. B60C 29/02
[52] U.S. Cl. .................................... 152/427; 152/430; 152/501; 152/508; 156/120
[58] Field of Search ................ 156/120; 152/427, 429, 152/430, 501, 508

[56] References Cited

U.S. PATENT DOCUMENTS 2,778,374 1/1957 Boyer .................................... 152/429

Primary Examiner—Michael W. Ball
Assistant Examiner—Francis J. Lorin
Attorney, Agent, or Firm—Pro-Techtor International

[57] ABSTRACT

The present invention concerns an improvement in securing a tire stem assembly. Specifically, a rubber packing piece, washer and securing nut-containing rubber packing piece are employed in this assembly, which cause the tire stem to bind tightly to the hub when the inner tube is inflated. The merit is that air cannot escape quickly from the space between the stem and the hub when the inner tube of a tire is punctured by a sharp object, thereby allowing the motor-driven vehicle to continue to operate.

2 Claims, 1 Drawing Sheet

TIRE STEM ASSEMBLY

BACKGROUND OF THE INVENTION

The present invention concerns an improvement in securing a tire stem assembly, and the merit of said invention is that, when the inner tube of a tire is punctured by a sharp object, air cannot escape readily through the space between the stem and the hub, allowing the motor-driven vehicle to continue to operate.

As shown in the figures pertaining to the assembly design of conventional stems, the contact between the stem and the hub is through a washer. Therefore, when the inner tube is punctured by a sharp object, air escapes quickly through the joining area between the stem and the hub, causing the motor-driven vehicle to be inoperable immediately.

The specific objective of the present invention is to prevented air from escaping quickly from the space between the stem and the hub when the inner tube of a tire is punctured by a sharp object, thereby allowing the motor-driven vehicle to continue to operate. Furthermore, the present invention provides the following merits:

(a) The assembly pertaining to the present invention can be used in tires for motor-driven vehicles, including trucks.

(b) Air cannot escape quickly from the joining area between the stem and the hub when the inner tube is punctured by a sharp object, and only a small amount of air can escape through the puncture point, which effect is very minimal.

(c) Driving safety can be improved.

| Description of the Notations | | | |
|---|---|---|---|
| 1 | Stem | 10 | Base |
| 11 | Inlet | 2 | Inner tube |
| 3 | Rubber packing piece | 4 | Protective packing sleeve |
| 5 | Washer | 6 | Rubber packing piece |
| 61 | Securing nut | 7 | Hub |
| 9 | Hazardous object | | |

DETAILED DESCRIPTION

Figure 1:
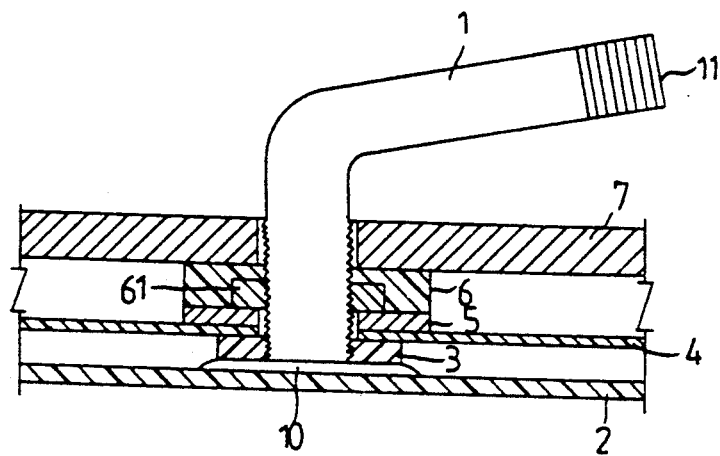
FIG. 1: An enlarged dissection figure of the assembly pertaining to the present invention.
Figure 2:
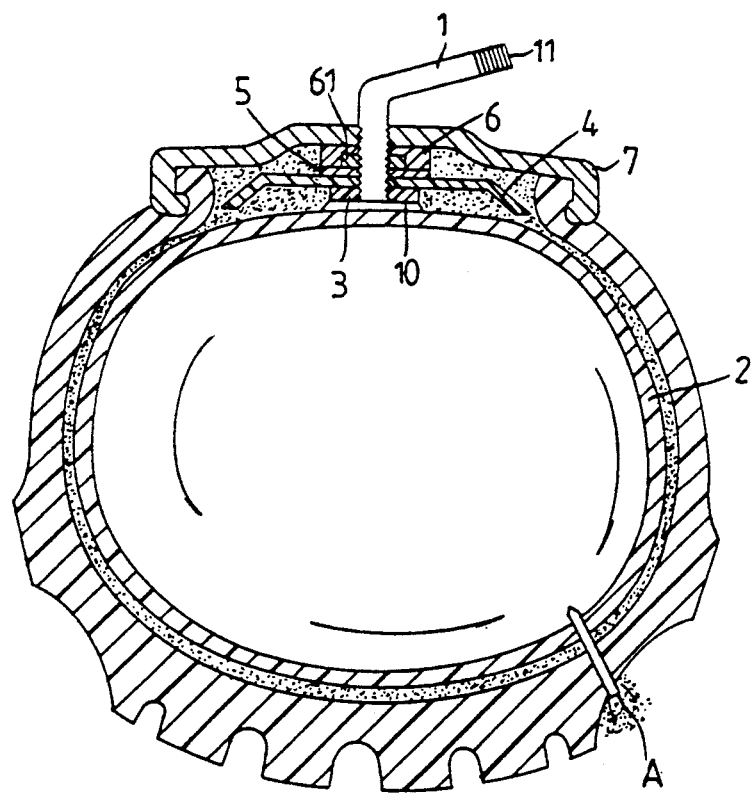
FIG. 2: A practical dissection figure of the assembly pertaining to the present invention.

The characteristics and practical merits of assembly pertaining to the present invention are described in detail below using drawing figures:

As shown in FIGS. 1 and 2, the present invention is principally comprised of a stem 1, which is bound to an inner tube 2 by means of a base 10 on the lower part of said stem, which possess a rubber packing piece 3, protective packing sleeve 4 (a known component), washer 5 and securing nut 61-containing rubber packing piece 6 placed on top of said base 10 in said order, and which is then secured in a standing position on a tire after inserting it through a hub 7.

A practical example is depicted in FIGS. 1 and 2. When air is pumped into the stem 1 through the inlet 11, the inner tube 2 expands, thereby pressurizing the rubber packing piece 3 and washer 5, which in turn causes the upper surface of the rubber packing piece 6 to bind tightly onto the inner wall of the hub 7. Since the binding force is based on air pressure, said force is quite large, eliminating any voids. Accordingly, air cannot escape quickly from the joining area between the stem 1 and hub 7 when the inner tube is punctured by a sharp object, and only a small amount of air can escape through the puncture point, which effect is very minimal. It will take two to three days before said puncture will affect the driveability of the motor-driven vehicle.

I claim:

1. An improved tire stem assembly comprising: a stem secured by a base thereof to an inner tube wherein a rubber packing piece, a protective packing sleeve, a washer and a securing nut-containing rubber packing piece are placed on top of said base in the order stated, said stem then being inserted through a hub.

2. The tire stem assembly of claim 1 wherein: the upper surface of the nut-containing rubber packing piece is bound tightly to the inner wall of the hub due to the pressure from air that is pumped into the tube.

* * * * *